United States Patent [19]

Harris

[11] 3,961,728

[45] June 8, 1976

[54] FLUID CONTAINER MOUNTING METHOD AND APPARATUS

[75] Inventor: James T. Harris, Cuyahoga Falls, Ohio

[73] Assignee: The Goodyear Tire & Rubber Company, Akron, Ohio

[22] Filed: Mar. 31, 1975

[21] Appl. No.: 563,601

[52] U.S. Cl. .......................... 222/180; 152/330 RF; 222/541
[51] Int. Cl.² .......................................... B67D 5/06
[58] Field of Search ............ 222/180, 541; 248/311, 248/312, 313, 314, 318; 215/31, 249, 250; 152/330 RF, 330 L, 330 C

[56] References Cited
UNITED STATES PATENTS

| | | | |
|---|---|---|---|
| 3,199,748 | 8/1965 | Bross | 222/541 X |
| 3,269,602 | 8/1966 | Weber | 222/180 X |

*Primary Examiner*—Allen N. Knowles
*Attorney, Agent, or Firm*—F. W. Brunner; M. L. Gill; Frederick K. Lacher

[57] ABSTRACT

A fluid container mounting and method of mounting in which the fluid container has a tubular member projecting outwardly from the container for insertion into an opening in a supporting member. The tubular member has a closure member extending over the end of the tubular member and away from the supporting member. A collar for clamping the closure member to the tubular member is mounted on the tubular member and is of a size for a generally close fit of the collar in the opening. A resilient lock is carried by the collar for retraction upon movement of the tubular member through the opening and for extension into locking engagement with the supporting member after insertion into the opening. Quick mounting of the container is provided by the method of retracting the lock, inserting the tubular member into the opening and pushing the tubular member through the opening to a position where the lock is released and resiliently set in locking engagement with the supporting member.

18 Claims, 5 Drawing Figures

FLUID CONTAINER MOUNTING METHOD AND APPARATUS

This invention relates to a fluid container mounting and method of mounting a fluid container on a supporting member. The invention is especially useful for mounting fluid containers on a tire stabilizer ring inside a tire for release of the fluid to lubricate and cool the tire when the tire is operated in the deflated condition.

Heretofore fluid containers have been mounted inside a tire and reference is made to the copending application, Ser. No. 563,602 of J. R. Hyndman and K. W. McIntosh for "Fluid Dispensing Apparatus for Tire Wheel Assembly", in which the fluid container is screwed into a stabilizer ring. Other mountings have included flanged collars which were screwed on the container neck after insertion in an opening in the ring. In these and other devices, the filling of the container with lubricant, capping of the inlet opening and mounting of the container has required considerable care and skill which has been costly in time and money. This is an especially important problem in the assembly of stabilizer rings and installation within tires on wheels in an automobile assembly line.

An object of this invention is to provide a fluid container mounting for insertion into an opening of a supporting member and locking engagement after insertion in the opening.

Another object is to provide a method of mounting a fluid container in which a locking member is retracted, a tubular member of the container is inserted into an opening in a supporting member and the locking member is released for locking engagement with the supporting member.

A further object is to provide a collar member for clamping a closure member to the tubular member and locking the container to the supporting member.

A still further object is to provide resilient actuation of the locking member for ease of installation in the supporting member.

Another object is to provide for limiting the distance the tubular member of the fluid container can be inserted into the opening in the supporting member.

A further object is to provide an opening in the supporting member having a configuration adapted to retract the locking member upon insertion of the tubular member of the container into the opening.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
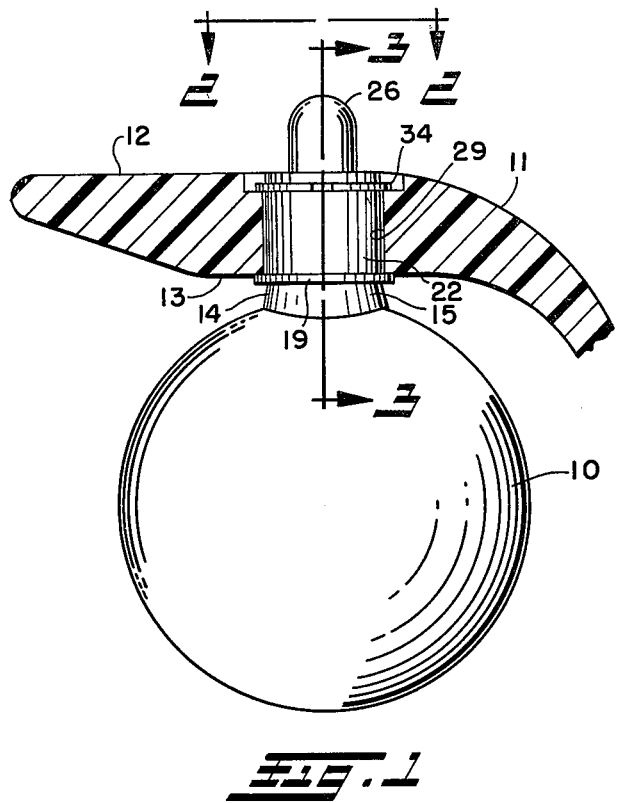
FIG. 1 is an elevation of the fluid container having a mounting embodying the invention and showing the container mounted in a supporting ring which has been sectioned to illustrate the mounting of the container in the ring.
Figure 2:
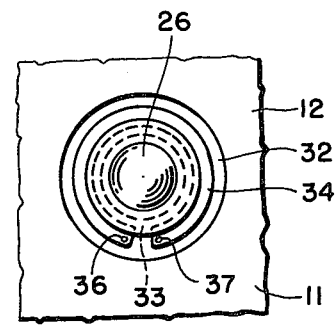
FIG. 2 is a plan view taken along the plane of line 2—2 of FIG. 1, parts of the supporting ring being broken away.
Figure 3:
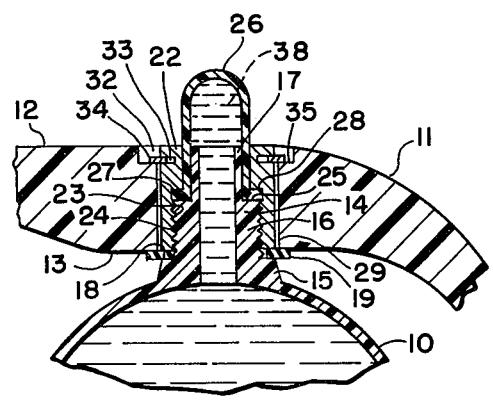
FIG. 3 is a fragmentary sectional view taken along the plane of line 3—3 of FIG. 1.

Referring to the drawings and particularly to FIGS. 1, 2 and 3, a fluid container such as hollow, spherical ball 10 is shown mounted on a supporting member such as a cantilever stabilizer ring 11. In one application the stabilizer ring 11 is an annular member divided into two halves for mounting on a drop center rim within a tire. The stabilizer ring 11 has an outer surface 12 which is spaced from the tread of the tire during operation of the tire in the inflated condition. On deflation of the tire the tread portion will engage the outer surface 12 which will support the tire. The ball 10 is mounted on the stabilizer ring 11 at a radially inner surface 13 spaced from the drop center rim where it is protected from damage during operation in the deflated condition of the tire and also where it is in a position to resist the high centrifugal forces generated during the operation of the vehicle at high speeds.

The ball 10 may be of a suitable plastic such as polyethylene which may be formed as by blow molding. A number of balls 10 may be spaced around the circumference of the stabilizer ring 11 if desired. The stabilizer ring 11 may be made from a material such as fiberglass reinforced plastic or from other materials having the required physical properties to support a vehicle and provide radial deflection for cushioning the vehicle when the tire is deflated and the tread portion of the tire is in engagement with the ring.

The ball 10 has an outwardly extending tubular member such as neck 14 which includes a base portion 15, an intermediate threaded portion 16 and a tubular end portion 17. The neck 14 may be cylindrical and has a shoulder 18 between the base portion 15 and threaded portion 16 for seating a backing member or washer 19 of resilient material such as rubber or spring steel. A collar 22 is mounted on the neck 14 and has internal threads 23 for threaded engagement with external threads 24 on the threaded portion 16 of the neck. A shoulder 25 on the neck 14 is located between the threaded portion 16 and tubular end portion 17 for seating of a closure member or nipple 26 which is slipped over the end portion. The nipple 26 has a beaded edge 27 for clamping between a radially extending clamping face 28 on the collar 22 and the shoulder 25 on neck 14.

Figure 4:
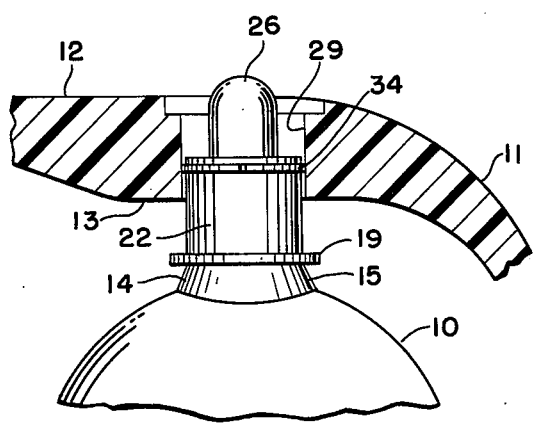
FIG. 4 is a view like FIG. 1 showing the mounting partially inserted in the opening of the supporting ring.

The stabilizer ring 11 has an opening or round hole 29 for receiving the collar 22 and preferably the diameter of the hole is substantially the same as the diameter of the collar to provide a close fit of the collar in the hole. The washer 19 has a diameter greater than the diameter of the hole 29 so that upon insertion of the collar 22 into the hole, the washer will engage the inner surface 13 of the stabilizer ring 11 and limit further movement of the collar through the ring, as shown in FIGS. 1 and 3. The hole 29 is counterbored at the outer surface 12 providing an offset 32 in the wall of the hole at the outer surface 12 surrounding the collar 22. A groove 33 extending around the collar 22 contains a locking member or snap ring 34 and is located for overlapping the offset 32 of the hole 29 with the ball 10 in the locked position, as shown in FIGS. 1, 2 and 3. The snap ring 34 may be circumferentially discontinuous and has holes 36 and 37 at the ends for receiving a snap ring removal tool to spread the ends and remove the snap ring from the groove 33. The snap ring 34 is of a resilient material such as steel so that upon insertion of the collar 22 through the hole 29, the snap ring will be retracted into the groove 33, as shown in FIG. 4 and then upon further movement of the collar 22 to a position where the washer 19 engages the inner surface 13, the snap ring 34 will be resiliently urged into overlapping relation with the offset 32.

The nipple 26 may be of a flexible resilient material having a predetermined tear strength and extends radially outward from the outer surface 12. The nipple 26 will withstand impacts from the tread portion of the tire during normal inflated operation of the tire; however, upon deflation of the tire, the tread portion will engage the outer surface 12 and the resulting shearing action against the nipple will tear the material and release fluid 38 from the ball 10. The fluid 38 may be a lubricant such as water or oil and may contain antifreeze solutions such as alcohol and ethylene glycol. Other compositions well known in the art may be carried in the ball 10 for release through the neck 14 when the tire is running in a deflated condition.

In accordance with this invention, the ball 10 can be filled with the lubricating fluid 38 prior to installation and mounting on the stabilizer ring 11. This is done with the collar 22 and the nipple 26 removed from the neck 14. The nipple 26 is then slipped over the tubular end portion 17 and the washer 19 placed in position on the shoulder 18. The collar 22 is then threaded over the threaded portion 16 clamping the washer 19 and the beaded edge 27 of the nipple 26 in position, as shown in FIG. 3. The clamping of the beaded edge 27 provides a fluid-tight seal retaining the fluid 38 in the ball 10. The snap ring 34 is mounted in the groove 33 and the ball 10 is ready for assembly in the hole 29 of the stabilizer ring 11.

The following method can be used to mount the ball 10 to the stabilizer ring 11 during initial installation of tires in an automobile assembly line or for replacing balls which have been emptied of the fluid 38 due to operation of the tire in the deflated condition. The neck 14 is inserted in the hole 29, as shown in FIG. 4, with the snap ring 34 urged into the groove 33 of the collar 22 and held in the groove by the walls of the hole as the neck and collar are moved further through the hole. The snap ring 34 may be pushed into the groove 33 by using a ring compressor extending around the collar 22 and removable after insertion of the ring in the hole 29. The snap ring 34 may also be pushed into groove 33 by inserting the collar 22 into the hole 29 at an angle so that the walls of the hole compress the snap ring. The neck 14 is then moved through the hole 29 until the snap ring 34 reaches a position corresponding to the offset 32 in the outer surface 12 of the stabilizer ring 11 whereupon the walls of the hole no longer compress the snap ring in the groove 33 and the resilient properties of the snap ring move it outward into overlapping relationship with the offset 32 of the hole and thereby lock the neck in position between the washer 19 and snap ring.

The washer 19 is of resilient material and therefore holds the snap ring 34 tightly against the offset 32 to prevent rattling of the ball 10 and movement which would cause imbalance of the tire and wheel assembly in operation. This is especially important at high speeds.

When it is desired to remove the ball 10 from the stabilizer ring 11, the stabilizer ring is removed from the wheel rim. The snap ring 34 is spread by inserting the snap ring removal tool in the holes 36 and 37, as shown in FIG. 2, to spread the snap ring and pull it out of the groove 33. The ball 10 and neck 14 can then be pulled out of the hole 29 for servicing.

Figure 5:
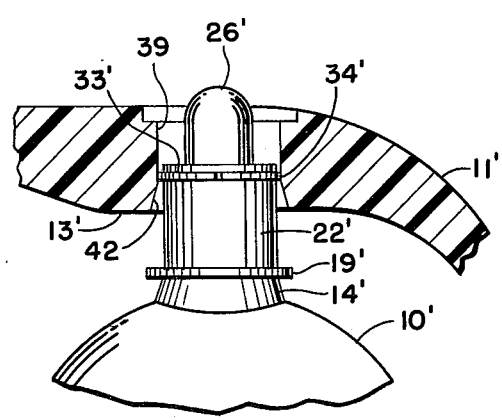
FIG. 5 is a view like FIG. 4 showing a modification of the invention.

Referring to FIG. 5, a modification is shown in which the construction of the ball 10', neck 14', collar 22', nipple 26' and snap ring 34' is identical with the construction described hereinabove for the embodiment shown in FIGS. 1 through 4. The stabilizer ring 11' has a hole 39 which is generally cylindrical and has a diameter substantially the same as the diameter of the collar 22' for a close fit of the collar in the hole. However, at the inner surface 13', the hole 39 has a flared end 42. The diameter of the flared end 42 at the inner surface 13' is substantially the same or greater than the diameter of the snap ring 34' in the spread locking condition so that upon insertion of the neck 14' and collar 22' into the hole 39, the snap ring will be urged into the groove 33' providing for easy movement of the snap ring through the hole and into the locking position shown in FIG. 3. The method of mounting the ball 10' is also the same as the method described above for embodiments of FIGS. 1 through 4 with the exception of the retraction of the snap ring 34'. This is because the flared end 42 automatically retracts the snap ring 34' into the groove 33' as the collar 22' is moved into the hole 39. Likewise, removal of the ball 10' from the stabilizer ring 11' is accomplished in the same manner as set forth above by removing the snap ring 34' and pulling the ball 10' out of the hole 39.

In some applications of this invention, the washer 19 may not be used and in such a case the base portion 15 of the ball 10 would have a greater diameter than the diameter of the hole 29 so that the inner surface 13 of the stabilizer ring 11 would bottom on the base portion instead of on the washer. It is also understood that rather than a ball 10, different shapes of fluid containers can be used including a tubular container extending along the inner surface 13 of the stabilizer ring 11.

While certain representative embodiments and details have been shown for the purpose of illustrating the invention, it will be apparent to those skilled in the art that various changes and other modifications may be made therein without departing from the invention.

What is claimed is:

1. A fluid container for locking engagement in an opening of a supporting member comprising a tubular member projecting outwardly from said container for insertion in said opening, a collar member fastened around said tubular member and having a size generally the same as the size of said opening for a generally close fit of said collar in said opening, separate locking means mounted on said collar member for movement outwardly of said collar member into locking engagement with said supporting member after movement of said collar member with said tubular member into said opening.

2. A fluid container in accordance with claim 1 wherein said locking means includes resilient means permitting deflection of said locking means upon insertion of said collar member with said tubular member into said opening and for urging said locking means into locking engagement with said supporting member after movement of said collar member into said opening.

3. A fluid container in accordance with claim 2 wherein said tubular member and said collar member are cylindrical, said opening is a round hole in said supporting member, said collar member has an annular groove and said locking means is a circumferentially discontinuous snap ring contained in said groove.

4. A fluid container in accordance with claim 2 wherein said opening extends from one side of said supporting member to the other side of said supporting member, a backing member mounted between said collar member and said container, said backing member extending outwardly from said collar member to engage said supporting member on said one side thereof and said locking means engaging said supporting member on said other side thereof.

5. A fluid container in accordance with claim 4 wherein said backing member is of a resilient material to resiliently urge said container away from said supporting member upon locking engagement of said locking means.

6. A fluid container in accordance with claim 5 wherein said backing member is a washer of resilient rubberlike material clamped between said collar member and said container in overlapping relation to said one side of said supporting member.

7. A fluid container in accordance with claim 3 further comprising a closure member of flexible material mounted on said tubular member, said flexible material having a predetermined tear strength for containing fluid under impact stresses and for releasing fluid under shear stresses which tear said closure member.

8. A fluid container in accordance with claim 7 wherein said closure member has a beaded edge and fits over the end of said tubular member and said collar member having a shoulder for engaging said beaded edge in clamping engagement with said tubular member.

9. A fluid container in accordance with claim 8 wherein said tubular member has external threads and said collar member has internal threads for threaded engagement of said collar member on said tubular member.

10. A fluid container in accordance with claim 3 wherein said opening in said supporting member has a flared end for receiving said snap ring in the extended condition and urging said ring into said groove as said collar member is pushed through said opening.

11. A fluid container in accordance with claim 3 wherein said opening in said supporting member has a counterbored end for receiving said snap ring in locking engagement with said supporting member at an offset below the surface of said supporting member.

12. A fluid container in accordance with claim 1 further comprising a closure member disposed over the end of said tubular member and clamped between said tubular member and said collar member in fluid-tight relationship.

13. A fluid container in accordance with claim 1 wherein said supporting member includes a cantilever ring member having an outer surface spaced from the tread of a tire during operation of the tire in the inflated condition, an inner surface spaced from a drop center rim, said opening extending between said inner surface at said other end and said outer surface at said one end and said container being located between said inner surface and said drop center rim.

14. A fluid container in accordance with claim 13 wherein a closure member is disposed over the end of said tubular member and clamped between said tubular member and said collar member in fluid-tight relationship and said closure member extending away from said outer surface for engagement by said tread upon deflation of said tire.

15. A fluid container in accordance with claim 13 wherein a backing member is mounted between said collar member and said container, said backing member extending outwardly from said collar member to engage said inner surface of said ring member and said locking means engaging said locking surface at said outer surface of said ring member.

16. A method of mounting a fluid container in locking engagement in an opening of a supporting member wherein said supporting member has a locking surface at one end of said opening and said container has a tubular member projecting outwardly from said container, a collar member fastened around said tubular member and a separate locking means carried by and movable outwardly of said collar member, comprising retracting said locking means on said collar member, inserting said tubular member with said collar member into the other end of said opening, further moving said tubular member through said opening, and extending said locking means over said locking surface into locking engagement with said supporting member.

17. A method of mounting a fluid container in accordance with claim 16 further comprising resiliently urging said locking means against the sides of said opening during said further moving of said tubular member with said collar member through said opening, and resiliently urging said locking means over said locking surface into locking engagement with said supporting member.

18. A method of mounting a fluid container in accordance with claim 16 wherein a backing member is clamped between said collar member and said container further comprising moving said tubular member through said opening to a position where said backing member comes into contact with said supporting member and then extending said locking means for locking engagement with said supporting member.

* * * * *